(12) United States Patent
Song

(10) Patent No.: US 12,351,292 B2
(45) Date of Patent: Jul. 8, 2025

(54) COLLISION LOAD DISTRIBUTION STRUCTURE OF FUSELAGE

(71) Applicants: Hyundai Motor Company, Seoul (KR); Kia Corporation, Seoul (KR)

(72) Inventor: Won Ki Song, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/223,347

(22) Filed: Jul. 18, 2023

(65) Prior Publication Data
US 2024/0253761 A1      Aug. 1, 2024

(30) Foreign Application Priority Data
Feb. 1, 2023   (KR) .......................... 10-2023-0013420

(51) Int. Cl.
*B64C 1/06*            (2006.01)
(52) U.S. Cl.
CPC .................................. *B64C 1/062* (2013.01)
(58) Field of Classification Search
CPC ............ B64C 1/062; B64C 1/08; B64C 1/068
See application file for complete search history.

(56) References Cited

U.S. PATENT DOCUMENTS 11,787,554 B2 * 10/2023 Regnier .................... B64C 1/06
                                                         244/135 R
2011/0272523 A1    11/2011 Uegaki
2012/0187717 A1     7/2012 Tanaka et al.

FOREIGN PATENT DOCUMENTS

| JP | 2010208479 A | 9/2010 |
| JP | 2011084247 A | 4/2011 |
| JP | 2011098656 A | 5/2011 |
| JP | 2016117422 A | 6/2016 |
| KR | 102153029 B1 | 9/2020 |

* cited by examiner

*Primary Examiner* — Timothy D Collins
*Assistant Examiner* — Eric Acosta
(74) *Attorney, Agent, or Firm* — Banner & Witcoff, Ltd.

(57) ABSTRACT

A collision load distribution structure of a fuselage includes a front unit configured to be located at front ends relative to wings attached to the fuselage, a rear unit configured to be located at rear ends relative to the wings attached to the fuselage, a support unit configured to be located between the front unit and the rear unit, and a wing unit. The support unit is configured to transfer loads applied to the fuselage in case of a crash of the fuselage. The wing unit is configured to be located in the support unit, and connected to the support unit so as to transfer the loads in case of the crash of the fuselage. Loads in a length direction of the fuselage are passed through to the front unit, and are distributed to the wing unit through the support unit.

20 Claims, 7 Drawing Sheets

COLLISION LOAD DISTRIBUTION STRUCTURE OF FUSELAGE

CROSS-REFERENCE TO RELATED APPLICATION

This application claims under 35 U.S.C. § 119(a) the benefit of priority to Korean Patent Application No. 10-2023-0013420 filed on Feb. 1, 2023, the entire contents of which are incorporated herein by reference.

TECHNICAL FIELD

The present disclosure relates to a collision load distribution structure of a fuselage. More particularly, it relates to a collision load distribution structure of a fuselage which distributes loads to a wing unit and transfers the loads to a rear part of the fuselage using a support unit when a collision occurs due to the crash of the fuselage.

BACKGROUND

Recently, urban air mobility (UAM) has been developed as an urban air transportation system which solves traffic congestion on roads. Such UAM, which is a transportation system configured to safely transport passengers to designated places, may require no separate runway due to the possibility of vertical takeoff and landing, may require no pilot due to the possibility of autonomous flight, and may be thus available at a low cost compared to a helicopter.

In the UAM, passengers may be located close to a fuselage, and thus, technology for securing stability in case of collision is important. The conventional UAM may not ensure safety of the passengers because heavy collision loads may be transferred to a boarding space in which the passengers are located due to impact applied to the fuselage in case of collision.

The above information disclosed in this Background section is only for enhancement of understanding of the background of the present disclosure and therefore it may contain information that does not form the prior art that is already known in this country to a person of ordinary skill in the art.

SUMMARY

Systems, apparatuses, and methods are described for a collision load distribution structure of a fuselage. The structure may comprise a front unit configured to be located at front ends relative to wings attached to the fuselage; a rear unit configured to be located at rear ends relative to the wings attached to the fuselage; a support unit configured to be connected between the front unit and the rear unit so as to transfer loads applied to the fuselage in case of a crash of the fuselage; and a wing unit, comprising the wings, configured to be connected to the support unit so as to transfer the loads in case of the crash of the fuselage. Loads in a length direction of the fuselage may be passed through to the front unit, and distributed to the wing unit through the support unit. Loads in a height direction of the fuselage may be passed through to the rear unit, and distributed to the wing unit through the support unit. These and other features and advantages are described in greater detail below.

BRIEF DESCRIPTION OF THE DRAWINGS

The above and other features of the present disclosure will now be described in detail with reference to certain examples thereof illustrated in the accompanying drawings which are given hereinbelow by way of illustration only, and thus are not limitative of the present disclosure, and wherein.

Figure 1:
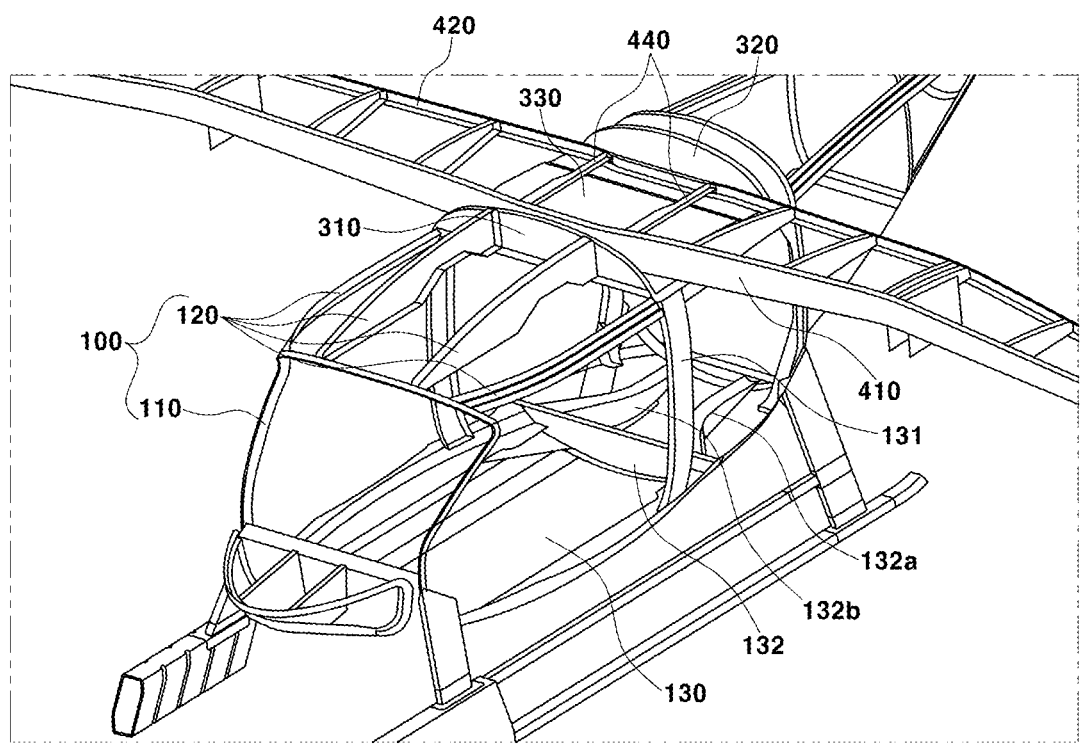
FIG. 1 is a perspective view of a collision load distribution structure of a fuselage.

It should be understood that the appended drawings may not be necessarily to scale, presenting a somewhat simplified representation of various examples illustrative of the present disclosure. The specific design features of the present disclosure, including, for example, specific dimensions, orientations, locations, and shapes, may be determined in part by the particular intended application and use environment.

In the figures, reference numbers refer to the same or equivalent parts of the present disclosure throughout the several figures of the drawing.

DETAILED DESCRIPTION

Hereinafter, examples of the present disclosure will be described in detail with reference to the accompanying drawings. The present disclosure is not limited to the following examples, and the examples may be implemented in various different forms. The examples are provided to make the description of the present disclosure thorough and to fully convey the scope of the present disclosure to those skilled in the art.

Further, in the following description of the examples, it will be understood that the suffixes "part", "unit", "member", etc. indicate units for processing at least one function or operation, and may be implemented as software and/or hardware.

When an element or layer is referred to as being "connected to" another element or layer, it may be directly connected to the other element or layer, or may be indirectly connected to the other element or layer, and, when it is indirectly connected to the other element or layer, it may be wirelessly connected to the other element or layer (e.g., through a wireless communication network).

In addition, in the following description of the examples, the term "upper end" means an upper end in a height direction in the drawings, and the term "lower end" means a lower end in the height direction in the drawings.

Further, in the following description of the examples, when an element or layer is referred to as being "on," another element or layer, it may be directly on the other element or layer, or intervening elements or layers may be present. In the same manner, when an element or layer is referred to as being "under," another element or layer, it may be directly under the other element or layer, or intervening elements or layers may be present.

In the following description of the examples, the terms "height direction," "width direction," and "length direction" are explained based on a fuselage.

Moreover, in the following description of the examples, the term "fuselage" may include urban air mobility (UAM), and the following description of the examples will be stated on the assumption that, when the UAM crashes, forward collision occurs.

In addition, in the following description of the examples, the term "center" indicates the center of the fuselage in the width direction, and the term "sides" indicates both ends of the fuselage in the width direction.

Figure 2:
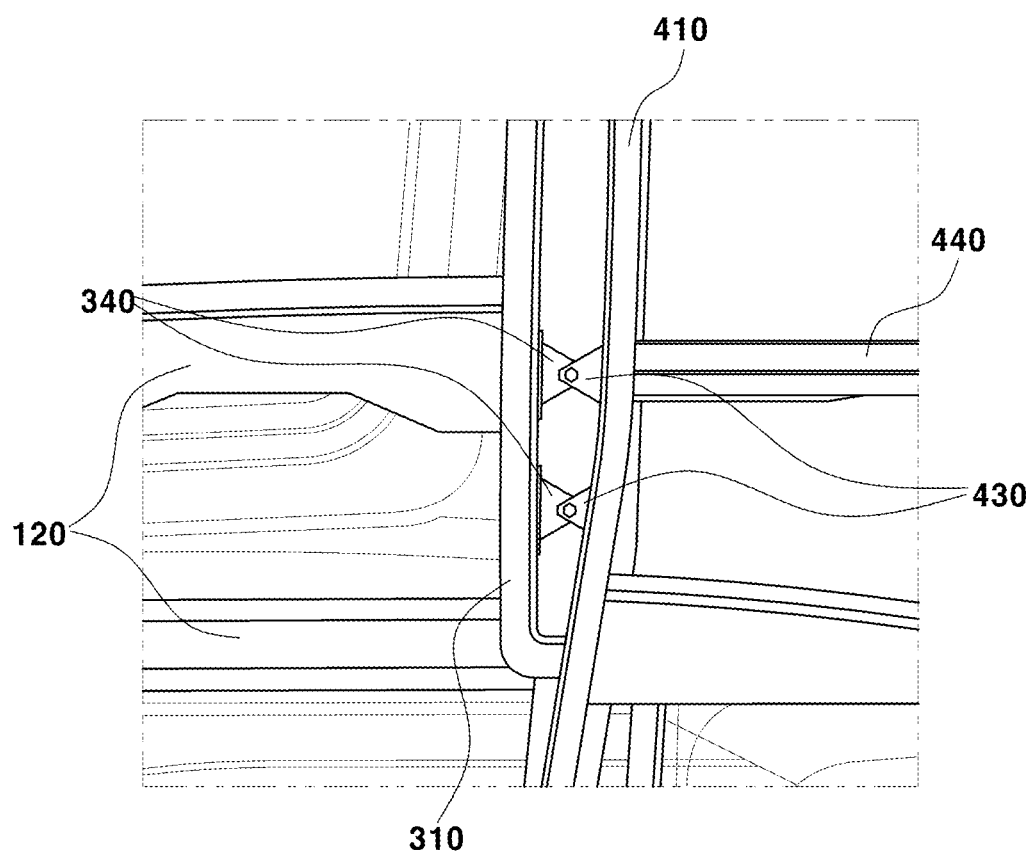
FIG. 2 is a side perspective view of the collision load distribution structure, showing coupling relations between support fitting members and wing fitting members.

FIG. 1 is a perspective view of a collision load distribution structure of a fuselage, and FIG. 2 is a side perspective view of the collision load distribution structure, showing coupling relations between support fitting members and wing fitting members.

Mobility may include an aircraft which is able not only to vertically take off and land but also to fly mid-range, and may be defined as advanced air mobility (AAM) including a manned or unmanned aircraft, an autonomous aerial vehicle, or a human-driven aerial vehicle. Since the fuselage of such mobility may have a similar structure to the structure of the fuselage of the above-described conventional aircraft, collision loads may be generated in the same direction as movement of the fuselage in a crash mode or in a vertical takeoff and landing mode using a runway, and thus, allowing the front and rear parts of the fuselage to absorb collision energy may reduce deformation of a boarding area.

According to FIGS. 1 and 2, the collision load distribution structure may include a support unit 300 provided between a front unit 100 and a rear unit 200 to be connected to a wing unit 400. The collision load distribution structure may be configured to distribute loads applied to the fuselage to the wing unit 400 and the rear part of the fuselage. For example, the collision load distribution structure may be configured such that loads in the length direction and loads in the height direction, which are applied to the fuselage, may be transferred through a connection structure between the front unit 100 and the support unit 300, a connection structure between the support unit 300 and the rear unit 200, and a connection structure between the support unit 300 and the wing unit 400. Thereby, the collision loads entering a boarding space, in which passengers are located, may be reduced by the collision load distribution structure.

The front unit 100 may be located at the front ends of wings attached to the fuselage. The front unit 100 may include a window frame 110 on which windshield glass is mounted, and roof frames 120. The roof frames 120 may be connected to the rear end of the window frame 110, and may extend in the length direction of the fuselage. The window frame 110 may be a frame which surrounds the windshield glass serving as the front surface of the fuselage. A plurality of roof frames 120 may be configured to be coupled to the upper end of the window frame 110, and may be spaced apart from one another in the width direction of the window frame 110. For example, a total of four roof frames 120, including two roof frames 120 located at the center and two roof frames 120 located at both sides in the width direction of the window frame 110, may be formed, as shown in FIG. 1. The four roof frames 120 may be configured to be spaced apart from one another by the same interval. A floor frame 130, which forms the floor of the fuselage, may separate an indoor space from the inside of the front unit 100, and may separate a first row passenger space located at a front position and a second row passenger space located at a rear position from each other. For example, the floor frame 130 may separate the first row passenger space and the second row passenger space from each other by a rear bulkhead 132, and a pair of connection frames 132a and 132b for connection to a second rear frame 220, which will be described below, may be connected to the rear bulkhead 132.

The support unit 300 may be located between the front unit 100 and the rear unit 200. The roof frames 120 may be connected to the support unit 300. For example, the rear ends of the roof frames 120 may be connected to the front end of the support unit 300. The support unit 300 may be connected to the front unit 100 and the rear unit 200 so as to distribute loads applied to the front part of the fuselage to the rear part of the fuselage. For example, the support unit 300 may include a first flange 310, a second flange 320, a plate 330, and/or support fitting members 340.

The support unit 300 may be configured such that the first flange 310 and the second flange 320 face each other across the plate 330. The support unit 300 may include a space formed on the inside thereof by the first flange 310 and the second flange 320 facing each other on the plate 330. The first flange 310 may be connected to the rear ends of the roof frames 120. For example, the rear ends of the roof frames 120 may be coupled to the front outer surface of the first flange 310. The second flange 320 may be connected to the front end of the rear unit 200. For example, the front end of the rear unit 200 may be coupled to the rear outer surface of the second flange 320.

The plate 330 may be provided between the first flange 310 and the second flange 320. For example, the plate 330 may form the rear surface of a recessed region between the first flange 310 and the second flange 320 located on both side surfaces of the plate 330 in the length direction thereof. The plate 330 may be formed in a plate type, and may be provided between the lower ends of the first flange 310 and the second flange 320. The plate 330 may be connected to members forming the external framework of the fuselage so as to transfer the loads in the length direction and the loads in the height direction of the fuselage.

The support fitting members 340 may be formed on the inner surfaces of both the first flange 310 and the second flange 320. For example, the support fitting members 340 may be formed on the inner surface of the first flange 310, and coupled to wing fitting members 430 located at positions corresponding to wing frames 440 in the length direction. As shown in FIG. 2, two support fitting members 340 may be formed on each of left and right sides in the width direction of the inner surface of the first flange 310, if reinforcement of a connection structure between the first flange 310 and a first frame 410 is used. Further, two support fitting members 340 may be formed on each of left and right sides in the width direction of the inner surface of the second flange 320. One end of each of the support fitting members 340 may be fixed to a corresponding position on the inner surfaces of the first flange 310 and the second flange 320, and a coupling part may be formed at the other end of each of the support fitting members 340 so as to be coupled to a corresponding one of the wing fitting members 430.

The wing unit 400 may be located in the support unit 300. The wing unit 400 may be connected to the support unit 300 so as to distribute loads along the wing unit 400 when collision of the fuselage occurs. The wing unit 400 may include the first frame 410, a second frame 420, the wing fitting members 430, the wing frames 440, and/or a skin part 450. The first frame 410 may be spaced apart from the inner surface of the first flange 310 by a designated distance, and may extend in the width direction of the fuselage. The second frame 420 may be spaced apart from the inner surface of the second flange 320 by a designated distance, and may extend in the width direction of the fuselage. The first frame 410 may form the lateral framework of the front end of the wing unit 400, and the second frame 420 may form the lateral framework of the rear end of the wing unit 400.

The wing fitting members 430 may be provided on the outer surfaces of the first frame 410 and the second frame 420 at positions corresponding to the support fitting members 340 in the length direction. Further, the outer surface of the first frame 410, on which the wing fitting members 430 are located, may face in a direction towards the first flange 310, and the outer surface of the second frame 420, on which the wing fitting members 430 are located, may face in a direction towards the second flange 320.

The wing fitting members 430 may be configured to be connected to the support fitting member 340. For example, two wing fitting members 430 may be formed on each of left and right sides in the width direction of the outer surface of the first frame 410. Further, two wing fitting members 430 may be formed on each of left and right sides in the width direction of the outer surface of the second frame 420. One end of each of the wing fitting members 430 may be fixed to the outer surface of a corresponding one of the first frame 410 and the second frame 420, and a coupling part of the other end of each of the wing fitting members 430. The coupling parts of the support fitting members 340 and the coupling parts of the wing fitting members 430 may be coupled to each other, and thereby, the wing unit 400 may be fixed to the support unit 300.

The wing frames 440 may be formed between the first frame 410 and the second frame 420. The wing fitting members 430 may be provided at a position corresponding to one end of each of the wing frames 440 in the length direction. For example, two wing frames 440 may be formed between the first frame 410 and the second frame 420 located on the plate 330, as shown in FIG. 1. Further, the wing frames 440 may be configured to be located between the first frame 410 and the second frame 420 so as to mutually transfer loads applied to the first frame 410 and the second frame 420 to each other. For example, the wing fitting members 430 and the support fitting members 340 are coupled to each other so that the wing frames 440 are located on the same lines as the roof frames 120 facing the wing frames 440, as shown in FIG. 2, and thus, the loads applied to the first frame 410 and the second frame 420 may be mutually transferred to the second frame 420 and the first frame 410.

The skin part 450 may be configured to surround the external surfaces of the first frame 410 and the second frame 420. For example, the skin part 450 may be located to come into contact with the upper surfaces of the first frame 410 and the second frame 420. The skin part 450, which is located to come into contact with the upper surfaces of the first frame 410 and the second frame 420, may be configured to distribute the loads, transferred to the first frame 410 and the second frame 420, in the length direction or the width direction of the wing unit 400. The loads in the length direction applied to the fuselage may pass through the front unit 100, and may be distributed to the wing unit 400 by the support unit 300.

Figure 3:
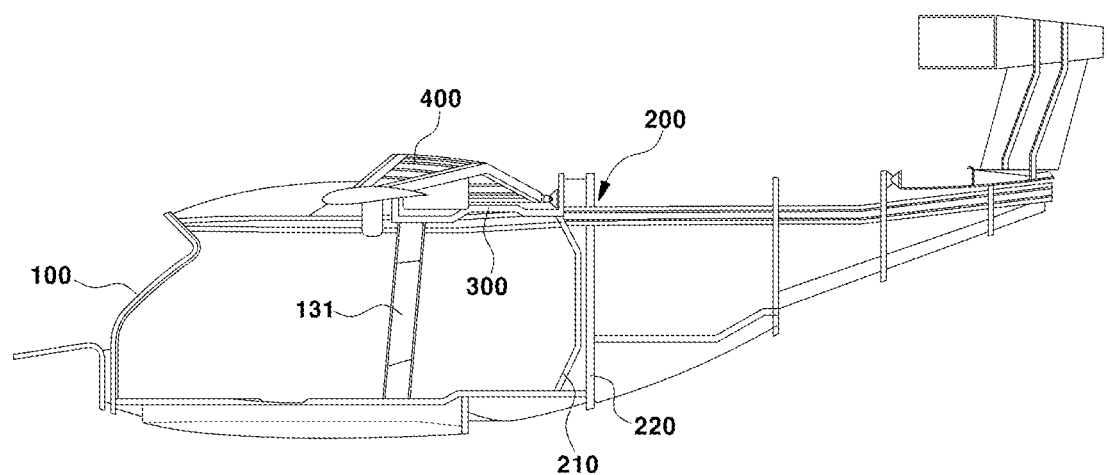
FIG. 3 is a sectional view showing a rear unit of the collision load distribution structure.
Figure 4:
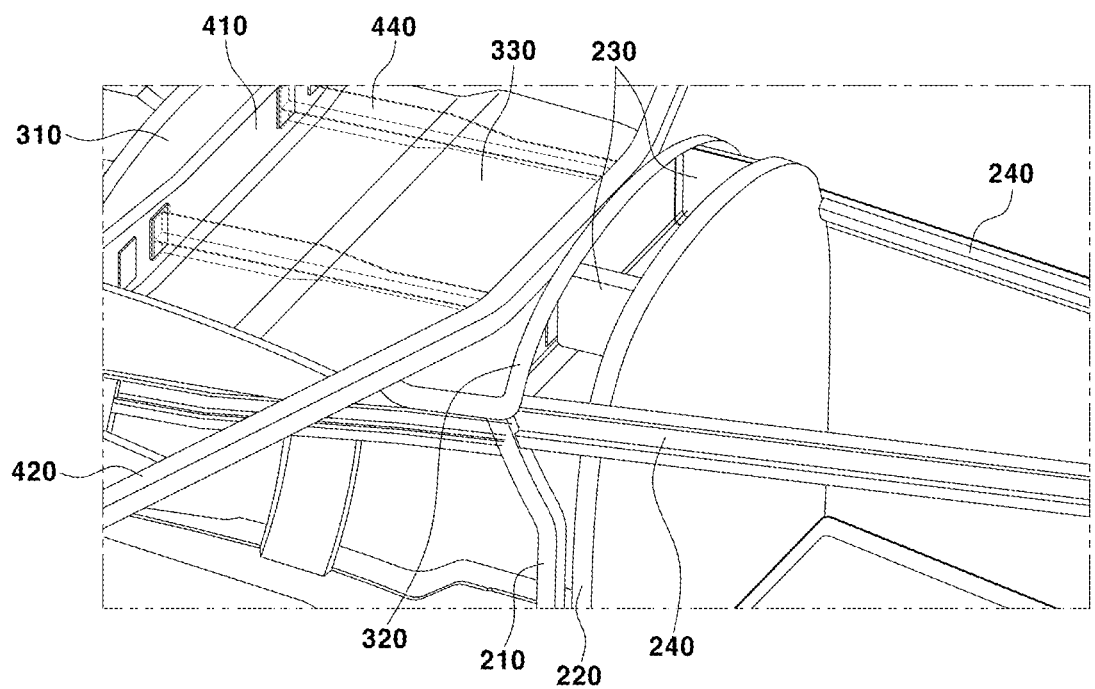
FIG. 4 is a perspective view showing connection relations between a wing unit and the rear unit of the collision load distribution structure.

FIG. 3 is a sectional view showing the rear unit 200 of the collision load distribution structure, and FIG. 4 is a perspective view showing connection relations between the wing unit 400 and the rear unit 200 of the collision load distribution structure.

Referring to FIGS. 3 and 4, the rear unit 200 may be located at the rear ends of the wings attached to the fuselage. The rear unit 200 may include first rear frames 210, the second rear frame 220, rear center frames 230, and/or rear side frames 240. The first rear frames 210 may be configured to be connected to the plate 330. For example, the first rear frames 210 may extend in the height direction along the outer surface of the fuselage, and may connect the floor of the fuselage to the lower end of the second flange 320. The first rear frames 210 may be located such that the upper ends of the first rear frames 210 may come into contact with the lower end of the second flange 320.

The second rear frame 220 may be located behind the first rear frames 210. For example, the second rear frame 220 may be formed in a plate type adjacent to the rear ends of the first rear frames 210. The second rear frame 220 may be coupled to the connection frames 132a and 132b provided in a pair and connected to the rear bulkhead 132. The second rear frame 220 may be located to be spaced from the upper ends of the first rear frames 210 by a designated distance, (e.g., by a distance corresponding to the length of the rear center frames 230 shown in FIG. 4), and may thus transfer loads, applied from the lower end of the fuselage, to the upper end of the fuselage in the height direction.

The rear center frames 230 may be located between the second flange 320 and the second rear frame 220. For example, the rear center frames 230 may be located in a space in which the second flange 320 and the second rear frame 220 face each other. Two rear center frames 230 may be formed at positions corresponding to the positions of the wing frames 440 in the length direction.

The rear side frames 240 may be located to come into contact with the first rear frames 210 and the second rear frame 220. For example, the rear side frames 240 may be connected to the upper ends of the rear frames 210 and the upper end of the second rear frame 220. The rear side frames 240 may extend rearwards in the length direction of the fuselage. For example, one end of each of the rear side frames 240 may be connected to a corresponding one of the first rear frames 210, and the other end of each of the rear side frames 240 may extend towards the rear part of the fuselage.

Figure 5:
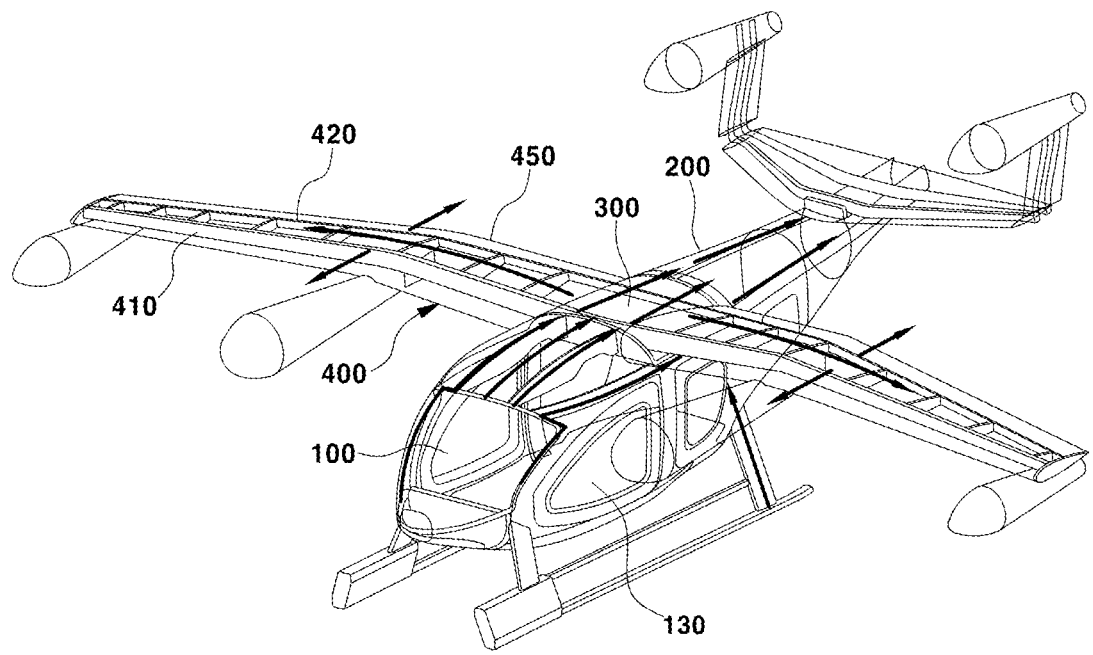
FIG. 5 is a perspective view showing distribution of loads in the length direction and loads in the height direction of the fuselage to the wing unit and the rear part of the fuselage in the collision load distribution structure.

FIG. 5 is a perspective view showing distribution of loads in the length direction and loads in the height direction to the wing unit 400 and the rear part of the fuselage in the collision load distribution structure.

Referring to FIG. 5, the loads in the length direction applied to the fuselage may be transferred to the first flange 310 through the window frame 110 and the roof frames 120. The loads in the length direction applied to the fuselage may be transferred to the first frame 410 through the support fitting members 340 and the wing fitting members 430, and may be distributed through the skin part 450. Further, the loads transferred to the first frame 410 may be transferred to the second frame 420 through the wing frames 440, and may be distributed through the skin part 450.

For example, if the fuselage crashes and collision loads are applied to the front end of the fuselage at a designated angle, loads in the length direction may be applied to the window frame 110, and may be transferred to the front ends of the roof frames 120 connected to the rear end of the window frame 110. Thereafter, the loads transferred to the rear ends of the roof frames 120 may be transferred to the first flange 310, and may then be transferred to the support fitting members 340 and the wing fitting members 430. The loads transferred to the support fitting members 340 and the wing fitting members 430 may be transferred to the first frame 410, and may be distributed in the length direction of the first frame 410. The loads distributed in the length direction of the first frame 410 may be distributed in the length direction of the fuselage through the skin part 450. Further, the loads transferred to the first frame 410 may be transferred to the second frame 420 through the wing frames 440, and may be distributed in the length direction of the second frame 420. The loads distributed in the length direction of the second frame 420 may be distributed in the length direction of the fuselage through the skin part 450.

If the fuselage crashes and the collision loads are applied to the front end of the fuselage at the designated angle, loads in the height direction transferred to the floor frame 130 may be transferred to the roof frames 120 and the second frame 420 through center frames 131 and the first rear frames 210. The loads in the height direction transferred to the floor frame 130 may be transferred to the rear side frames 240 and the rear center frames 230 of the rear unit 200 through the second rear frame 220. The loads in the height direction transferred to the floor frame 130 may be transferred to the second frame 420 through the support fitting members 340 and the wing fitting members 430, and may be distributed through the skin part 450. Further, the loads transferred to the second frame 420 may be transferred to the first frame 410 through the wing frames 440, and may be distributed through all regions of the fuselage.

Figure 7:
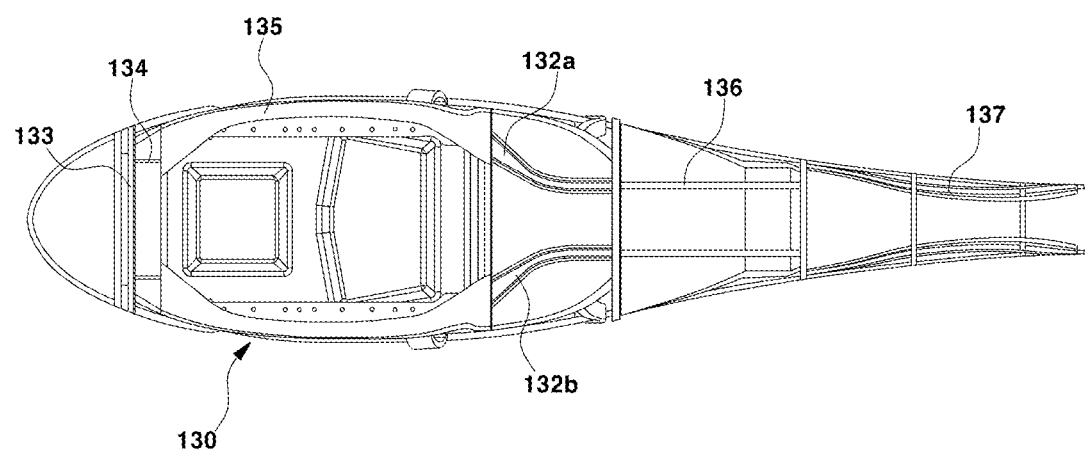
FIG. 7 is a top view showing transfer of floor frame loads in the collision load distribution structure.

For example, if collision loads in the height direction are applied to the fuselage, the loads in the height direction transferred to the fuselage may be sequentially transferred to the lower ends of the center frames 131 and the first rear frames 210 (e.g., along a front reinforcement member 133, first and second frame members 134 and 135, the connection frames 132a and 132b, third frame members 136, and fourth frame members 137 of the floor frame 130, as shown in FIG. 7), and at the same time, may be transferred to the roof frames 120 and the second flange 320 connected to the upper ends of the center frames 131 and the first rear frames 210. Moreover, some of the collision loads in the height direction applied to the fuselage may be transferred to the lower end of the second rear frame 220, and may then be transferred to the rear side frames 240 connected to the upper end of the second rear frame 220. The collision loads transferred to the second rear frame 220 may be transferred to the second flange 320, and may be transferred to the wing fitting members 430 through the support fitting members 340 coupled to the second flange 320. The loads transferred to the support fitting members 340 and the wing fitting members 430 may be transferred to the second frame 420, and may be distributed in the length direction of the second frame 420. The loads distributed in the length direction of the second frame 420 may be distributed in the length direction of the fuselage through the skin part 450. Further, the loads distributed to the second frame 420 may be distributed to the first frame 410 through the wing frames 440, and may be distributed in the length direction of the first frame 410. The loads distributed in the length direction of the first frame 410 may be distributed in the length direction of the fuselage through the skin part 450. Thereby, the loads applied in the height direction of the fuselage may be transferred to the rear unit 200, and may be distributed to the wing unit 400 through the support unit 300.

Figure 6:
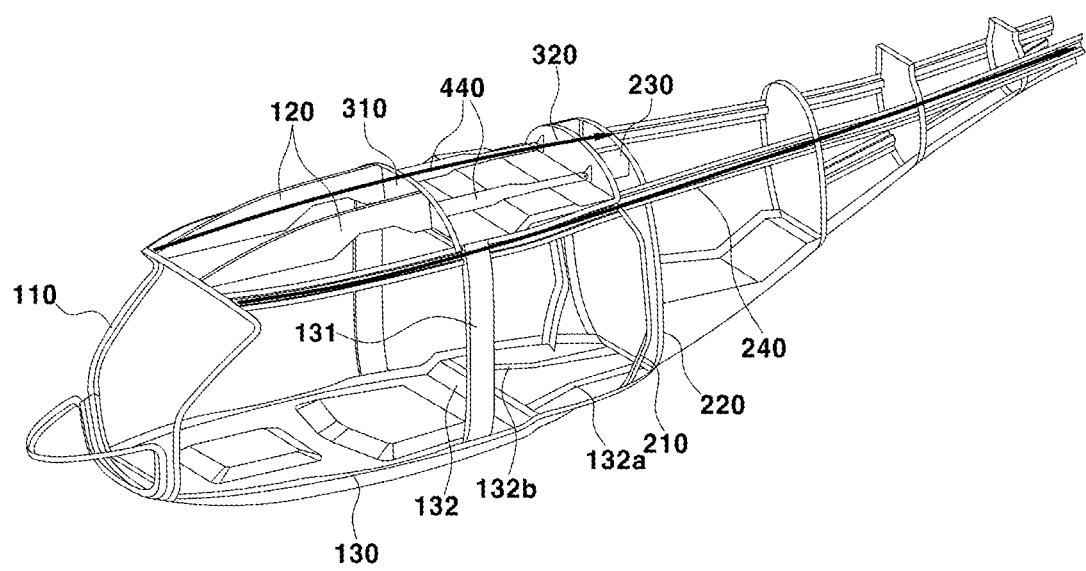
FIG. 6 is a perspective view showing transfer of center loads and side loads in the length direction of the fuselage in the collision load distribution structure.

FIG. 6 is a perspective view showing transfer of center loads and side loads in the length direction in the collision load distribution structure.

Referring to FIG. 6, the loads applied in the length direction of the fuselage may be transferred from the roof frames 120 to the wing frames 440 through the first flange 310, and may be transferred from the wing frames 440 to the rear center frames 230 through the second flange 320. Further, among the loads applied in the length direction of the fuselage, side loads applied in the length direction of the fuselage may be transferred to the rear side frames 240 via the first rear frames 210 along the side surfaces of the plate 330 from the roof frames 120 located at the both sides of the front part of the fuselage.

For example, among the loads applied in the length direction of the fuselage, center loads applied in the length direction of the fuselage may be transferred from the front ends to the rear ends of the roof frames 120, and may be transferred to the support fitting members 340 and the wing fitting members 430 adjacent to the first flange 310 through the first flange 310. Thereafter, the loads transferred to the support fitting members 340 and the wing fitting members 430 adjacent to the first flange 310 may be transferred to the wing frames 440, and may be transferred to the support fitting members 340 and the wing fitting members 430 adjacent to the second flange 320. The loads transferred to the support fitting members 340 and the wing fitting members 430 adjacent to the first flange 310 may be transferred to the second flange 320, and may be transferred to the rear center frames 230.

Further, among the loads applied in the length direction of the fuselage, loads transferred to the side surfaces of the fuselage may be transferred to the front end to the rear end of the fuselage along the outermost roof frames 120, and may be transferred to the rear surface of the fuselage in the length direction of the plate 330. The loads transferred to the rear end of the plate 330 may be transferred to the rear side frames 240 via the first rear frames 210.

In summary, the present disclosure provides the collision load distribution structure which may transfer and distribute collision loads applied to the fuselage to the wing unit 400 and the rear part of the fuselage using the support unit 300, and may thus reduce an amount of the collision loads entering a boarding space of passengers so as to secure stability of the fuselage.

As is apparent from the above description, the present disclosure provides the following effects through the above-described configuration and connection and usage relations.

A collision load distribution structure of a fuselage according to the present disclosure may be configured to reduce transfer of collision loads to a boarding space of passengers in case of slope crash of the fuselage, thereby being capable of ensuring safety of the passengers.

Further, the collision load distribution structure may transfer and distribute the collision loads applied to the fuselage to a wing unit and the rear part of the fuselage using a support unit, and may thus minimize deformation of the fuselage while supporting the collision loads entering the boarding space of the passengers.

The present disclosure has been made in an effort to solve the above-described problems associated with the prior art, and it is an object of the present disclosure to provide a collision load distribution structure of a fuselage which may reduce transfer of collision loads to a boarding space of passengers in case of slope crash of the fuselage.

It is another object of the present disclosure to provide a collision load distribution structure of a fuselage which may transfer collision loads applied to the fuselage to a wing unit and the rear part of the fuselage using a support unit so as to minimize deformation of the fuselage while supporting the collision loads entering a boarding space of passengers.

The present disclosure provides collision load distribution structure of a fuselage, including a front unit configured to be located at front ends relative to wings attached to the fuselage, a rear unit configured to be located at rear ends relative to the wings attached to the fuselage, a support unit configured to be located between the front unit and the rear unit, and connected to the front unit and the rear unit so as to transfer loads applied to the fuselage in case of a crash of the fuselage, and a wing unit, comprising the wings, configured to be located in the support unit, and connected to the support unit so as to transfer the loads in case of the crash of the fuselage, wherein loads in a length direction of the fuselage pass through to the front unit, and are distributed to the wing unit through the support unit.

The front unit may include a window frame, and roof frames configured to be connected to a rear end of the window frame, and to extend in the length direction of the fuselage so as to be connected to the support unit.

The support unit may include a first flange configured to be connected to rear ends of the roof frames, a second flange configured to be connected to a front end of the rear unit, a plate configured to be provided between the first flange and the second flange, and support fitting members configured to be provided on an inner surface of the first flange and an inner surface of the second flange.

The wing unit may include a first frame configured to be spaced apart from the inner surface of the first flange and to extend in a width direction of the fuselage, a second frame configured to be spaced apart from the inner surface of the second flange and to extend in the width direction of the fuselage, wing fitting members configured to be provided on outer surfaces of the first flange and the second flange at positions corresponding to the support fitting members, and connected to the support fitting members, wing frames configured to be provided between the first frame and the second frame so as to correspond to the wing fitting members, and a skin part configured to surround external surfaces of the first frame and the second frame.

The rear unit may include first rear frames configured to be connected to the plate, a second rear frame configured to be located at rear ends of the first rear frames, rear center frames configured to be located between the second flange and the second rear frame, and rear side frames configured to be connected to the first rear frames and the second rear frame, and to extend rearwards in the length direction of the fuselage.

The loads in the length direction of the fuselage may be transferred to the first flange through the window frame and the roof frames, may be transferred to the first frame through the support fitting members and the wing fitting members, and may be distributed through the skin part.

The loads transferred to the first frame may be transferred to the second frame through the wing frames, and may be distributed through the skin part.

Loads in a height direction of the fuselage may be transferred to the second flange through the first rear frames and the second rear frame, may be transferred to the second frame through the support fitting members and the wing fitting members, and may be distributed through the skin part. The loads transferred to the second frame may be transferred to the first frame through the wing frames, and may be distributed through the skin part.

Center loads in the length direction of the fuselage may be transferred from the roof frames to the wing frames through the first flange, and may be transferred to the rear center frames from the wing frames through the second flange. Side loads in the length direction of the fuselage may be transferred to the rear side frames via the first rear frames along side surfaces of the plate from outermost ones of the roof frames, located at both side ends of a front part of the fuselage.

The present disclosure provides a collision load distribution structure of a fuselage, including a front unit configured to be located at front ends relative to wings attached to the fuselage, a rear unit configured to be located at rear ends relative to the wings attached to the fuselage, a support unit configured to be located between the front unit and the rear unit, and connected to the front unit and the rear unit so as to transfer loads applied to the fuselage in case of a crash of the fuselage, and a wing unit configured to be located in the support unit, and connected to the support unit so as to transfer the loads in case of the crash of the fuselage, wherein loads in a height direction of the fuselage may be passed through to the rear unit, and are distributed to the wing unit through the support unit.

The support unit may include a first flange configured to be connected to a rear end of the front unit, a second flange configured to be connected to a front end of the rear unit, a plate configured to be provided between the first flange and the second flange, and support fitting members configured to be provided on inner surfaces of the first flange and the second flange.

The wing unit may include a first frame configured to be spaced apart from the inner surface of the first flange and to extend in a width direction of the fuselage, a second frame configured to be spaced apart from the inner surface of the second flange and to extend in the width direction of the fuselage, wing fitting members configured to be provided on outer surfaces of the first flange and the second flange at positions corresponding to the support fitting members, and connected to the support fitting members, wing frames configured to be provided between the first frame and the second frame so as to correspond to the wing fitting members, and a skin part configured to surround external surfaces of the first frame and the second frame.

The rear unit may include first rear frames configured to be connected to the plate, a second rear frame configured to be located at rear ends of the first rear frames, rear center frames configured to be located between the second flange and the second rear frame, and rear side frames configured to be connected to the first rear frames and the second rear frame, and to extend rearwards in the length direction of the fuselage.

The loads in the height direction of the fuselage may be transferred to the second flange through the first rear frames and the second rear frame, may be transferred to the second frame through the support fitting members and the wing fitting members, and may be distributed through the skin part. The loads transferred to the second frame may be transferred to the first frame through the wing frames, and may be distributed through the skin part.

The present disclosure has been described in detail with reference to examples. However, it should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. A structure comprising:
a front unit configured to be located at front ends relative to wings attached to a fuselage;
a rear unit configured to located at rear ends relative to the wings attached to the fuselage;
a support unit configured to be connected between the front unit and the rear unit so as to transfer loads applied to the fuselage in case of a crash of the fuselage; and
a wing unit, comprising the wings, configured to be connected to the support unit so as to transfer the loads in case of the crash of the fuselage,
wherein loads in a length direction of the fuselage are passed through to the front unit, and are distributed to the wing unit through the support unit,
wherein the front unit comprises:
a window frame; and
roof frames configured to:
be connected to a rear end of the window frame, and
extend in the length direction of the fuselage so as to be connected to the support unit, and
wherein the support unit comprises:
a first flange configured to be connected to rear ends of the roof frames;
a second flange configured to be connected to a front end of the rear unit;
a plate configured to be provided between the first flange and the second flange; and
support fitting members configured to be provided on an inner surface of the first flange and an inner surface of the second flange.

2. The structure of claim 1, wherein the wing unit comprises:
a first frame configured to be spaced apart from the inner surface of the first flange and to extend in a width direction of the fuselage;
a second frame configured to be spaced apart from the inner surface of the second flange and to extend in the width direction of the fuselage;
wing fitting members configured to be provided on outer surfaces of the first flange and the second flange at positions corresponding to the support fitting members, and connected to the support fitting members;
wing frames configured to be provided between the first frame and the second frame so as to correspond to the wing fitting members; and
a skin part configured to surround external surfaces of the first frame and the second frame.

3. The structure of claim 2, wherein the rear unit comprises:
first rear frames configured to be connected to the plate;
a second rear frame configured to be located at rear ends of the first rear frames;
rear center frames configured to be located between the second flange and the second rear frame; and
rear side frames configured to:
be connected to the first rear frames and the second rear frame; and
extend rearwards in the length direction of the fuselage.

4. The structure of claim 2, wherein:
the loads in the length direction of the fuselage are transferred to the first flange through the window frame and the roof frames;
the loads in the length direction of the fuselage are transferred to the first frame through the support fitting members and the wing fitting members; and
the loads in the length direction of the fuselage are distributed through the skin part.

5. The structure of claim 4, wherein:
the loads transferred to the first frame are transferred to the second frame through the wing frames; and
the loads transferred to the first frame are distributed through the skin part.

6. The structure of claim 3, wherein:
loads in a height direction of the fuselage are transferred to the second flange through the first rear frames and the second rear frame;
the loads in a height direction of the fuselage are transferred to the second frame through the support fitting members and the wing fitting members; and
the loads in a height direction of the fuselage are distributed through the skin part.

7. The structure of claim 6, wherein:
the loads transferred to the second frame are transferred to the first frame through the wing frames; and
the loads transferred to the second frame are distributed through the skin part.

8. The structure of claim 3, wherein:
center loads in the length direction of the fuselage are transferred from the roof frames to the wing frames through the first flange;
the center loads in the length direction of the fuselage are transferred to the rear center frames from the wing frames through the second flange; and
side loads in the length direction of the fuselage are transferred to the rear side frames via the first rear frames along side surfaces of the plate from the outermost ones of the roof frames, located at both side ends of a front part of the fuselage.

9. The structure of claim 1, wherein:
the wing unit is accommodated between a protruded portion of the first flange and a protruded portion of the second flange, and
wherein a center portion of the wing unit is located in the support unit and located above the plate.

10. A structure comprising:
a front unit configured to be located at front ends relative to wings attached to a fuselage;
a rear unit configured to be located at rear ends relative to the wings attached to the fuselage;
a support unit configured to be connected between the front unit and the rear unit so as to transfer loads applied to the fuselage in case of a crash of the fuselage; and
a wing unit, comprising the wings, configured to be connected to the support unit so as to transfer the loads in case of the crash of the fuselage,
wherein loads in a height direction of the fuselage are passed through to the rear unit, and are distributed to the wing unit through the support unit, and
wherein the support unit comprises:
a first flange configured to be connected to a rear end of the front unit;
a second flange configured to be connected to a front end of the rear unit;
a plate configured to be provided between the first flange and the second flange; and
support fitting members configured to be provided on an inner surface of the first flange and an inner surface of the second flange.

11. The structure of claim 10, wherein the wing unit comprises:
- a first frame configured to be spaced apart from the inner surface of the first flange and to extend in a width direction of the fuselage;
- a second frame configured to be spaced apart from the inner surface of the second flange and to extend in the width direction of the fuselage;
- wing fitting members configured to be provided on outer surfaces of the first flange and the second flange at positions corresponding to the support fitting members, and connected to the support fitting members;
- wing frames configured to be provided between the first frame and the second frame so as to correspond to the wing fitting members; and
- a skin part configured to surround external surfaces of the first frame and the second frame.

12. The structure of claim 11, wherein the rear unit comprises:
- first rear frames configured to be connected to the plate;
- a second rear frame configured to be located at rear ends of the first rear frames;
- rear center frames configured to be located between the second flange and the second rear frame; and
- rear side frames configured to:
  - be connected to the first rear frames and the second rear frame; and
  - extend rearwards in a length direction of the fuselage.

13. The structure of claim 12, wherein:
- the loads in the height direction of the fuselage are transferred to the second flange through the first rear frames and the second rear frame;
- the loads in the height direction of the fuselage are transferred to the second frame through the support fitting members and the wing fitting members; and
- the loads in the height direction of the fuselage are distributed through the skin part.

14. The structure of claim 13, wherein:
- the loads transferred to the second frame are transferred to the first frame through the wing frames; and
- the loads transferred to the second frame are distributed through the skin part.

15. The structure of claim 10, wherein:
- the wing unit is accommodated between a protruded portion of the first flange and a protruded portion of the second flange, and
- wherein a center portion of the wing unit is located in the support unit and located above the plate.

16. A vehicle comprising:
- a front unit configured to be located at front ends relative to wings attached to a fuselage;
- a rear unit configured to be located at rear ends relative to the wings attached to the fuselage;
- a support unit configured to be connected between the front unit and the rear unit so as to transfer loads applied to the fuselage in case of a crash of the fuselage; and
- a wing unit, comprising the wings, configured to be connected to the support unit so as to transfer the loads in case of the crash of the fuselage,
- wherein loads in at least one direction of the fuselage are passed through to at least one of the front unit or the rear unit, and are distributed to the wing unit through the support unit, and
- wherein the support unit comprises:
  - a first flange configured to be connected to a rear end of the front unit;
  - a second flange configured to be connected to a front end of the rear unit; and
  - a plate configured to be provided between the first flange and the second flange.

17. The vehicle of claim 16, wherein:
- the wing unit is accommodated between a protruded portion of the first flange and a protruded portion of the second flange, and
- wherein a center portion of the wing unit is located in the support unit and located above the plate.

18. The vehicle of claim 17, wherein the wing unit comprises:
- a first frame configured to be spaced apart from an inner surface of the first flange and to extend in a width direction of the fuselage; and
- a second frame configured to be spaced apart from an inner surface of the second flange and to extend in the width direction of the fuselage.

19. The vehicle of claim 17, wherein the rear unit comprises:
- first rear frames configured to be connected to the plate;
- a second rear frame configured to be located at rear ends of the first rear frames;
- rear center frames configured to be located between the second flange and the second rear frame; and
- rear side frames configured to:
  - be connected to the first rear frames and the second rear frame; and
  - extend rearwards in a length direction of the fuselage.

20. The vehicle of claim 16, wherein:
- loads in a length direction of the fuselage are passed through to the front unit, and are distributed to the wing unit through the support unit, and
- loads in a height direction of the fuselage are passed through to the rear unit, and are distributed to the wing unit through the support unit.

* * * * *